(12) United States Patent
Chalfant et al.

(10) Patent No.: US 6,451,465 B1
(45) Date of Patent: Sep. 17, 2002

(54) METHOD FOR OPERATING A COMBUSTOR IN A FUEL CELL SYSTEM

(75) Inventors: Robert W. Chalfant, West Henrietta; Bruce J. Clingerman, Palmyra, both of NY (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/498,889

(22) Filed: Feb. 7, 2000

(51) Int. Cl.$^7$ ................................................ H01M 8/18
(52) U.S. Cl. ............................ 429/20; 429/12; 429/13; 429/22
(58) Field of Search ............................ 429/12, 13, 20, 429/22

(56) References Cited

U.S. PATENT DOCUMENTS

| | | |
|---|---|---|
| 4,128,700 A | 12/1978 | Sederquist |
| 4,650,727 A | 3/1987 | Vanderborgh et al. |
| 4,659,634 A | 4/1987 | Struthers |
| 4,670,359 A | 6/1987 | Beshty et al. |
| 4,923,768 A | 5/1990 | Kaneko et al. |
| 4,994,331 A | 2/1991 | Cohen |
| 5,248,567 A | 9/1993 | Amemiya et al. |
| 5,271,916 A | 12/1993 | Vanderborgh et al. |
| 5,272,017 A | 12/1993 | Swarthirajan et al. |
| 5,316,871 A | 5/1994 | Swarthirajan et al. |
| 5,484,577 A | 1/1996 | Buswell et al. |
| 5,554,453 A | 9/1996 | Steinfeld et al. |
| 5,605,770 A | 2/1997 | Andreoli et al. |
| 5,637,415 A | 6/1997 | Meltser |
| 5,763,113 A | 6/1998 | Meltser et al. |
| 6,165,633 A | * 12/2000 | Negishi ..................... 429/17 |

FOREIGN PATENT DOCUMENTS

WO    WO 98/08771    3/1998

OTHER PUBLICATIONS

Szaniszlo, "The Advanced Low–Emissions Catalytic–Combustor Program: Phase I—Description and Status," ASME #79–GT–192.
Krill et al., "Catalytic Combustion for System Applications," ASME #79–HT–54.
Hall et al., "A Porous Media Burner for reforming Mehtanol for Fuel Cell Electric Vehicles," SAE Paper #950095.
Natural Gas Power Plant System ( a descriptive drawing).

* cited by examiner

Primary Examiner—Carol Chaney
Assistant Examiner—D. Wei Yuan
(74) Attorney, Agent, or Firm—Karl F. Barr, Jr.; Cary W. Brooks; Linda M. Deschere

(57) ABSTRACT

A method of operating a combustor to heat a fuel processor in a fuel cell system, in which the fuel processor generates a hydrogen-rich stream a portion of which is consumed in a fuel cell stack and a portion of which is discharged from the fuel cell stack and supplied to the combustor, and wherein first and second streams are supplied to the combustor, the first stream being a hydrocarbon fuel stream and the second stream consisting of said hydrogen-rich stream, the method comprising the steps of monitoring the temperature of the fuel processor; regulating the quantity of the first stream to the combustor according to the temperature of the fuel processor; and comparing said quantity of said first stream to a predetermined value or range of predetermined values.

9 Claims, 2 Drawing Sheets

US 6,451,465 B1

METHOD FOR OPERATING A COMBUSTOR IN A FUEL CELL SYSTEM

GOVERNMENT SUPPORT

The Government of the United States of America has right in this invention pursuant to Agreement No. DE-AC02-90CH10435 awarded by the U.S. Department of Energy.

FIELD OF THE INVENTION

This invention relates to a fuel cell system and more particularly to a combustor which heats a fuel processor which produces an $H_2$-rich feed gas for consumption in a fuel cell stack.

BACKGROUND OF THE INVENTION

Fuel cells have been used as a power source in many applications. For example, fuel cells have been proposed for use in electrical vehicular power plants to replace internal combustion engines. In proton exchange membrane (PEM) type fuel cells, hydrogen is supplied to the anode of the fuel cell and oxygen is supplied as the oxidant to the cathode. PEM fuel cells include a membrane electrode assembly (MEA) comprising a thin, proton transmissive, non-electrically conductive solid polymer electrolyte membrane having the anode catalyst on one of its faces and the cathode catalyst on the opposite face. The MEA is sandwiched between a pair of electrically conductive elements which (1) serve as current collectors for the anode and cathode, and (2) contain appropriate channels and/or openings therein for distributing the fuel cells gaseous reactants over the surfaces of the respective anode and cathode catalysts. The term fuel cell is typically used to refer to either a single cell or a plurality of cells (stack) depending on the context. A plurality of individual cells are commonly bundled together to form a fuel cell stack and are commonly arranged in series. Each cell within the stack comprises the membrane electrode assembly (MEA) described earlier, and each such MEA provides its increment of voltage. A group of adjacent cells within the stack is referred to as a cluster. Typical arrangements of multiple cells in a stack are described in U.S. Pat. No. 5,763,113, assigned to General Motors Corporation.

In PEM fuel cells, hydrogen ($H_2$) is the anode reactant (i.e., fuel) and oxygen is the cathode reactant (i.e., oxidant). The oxygen can be either a pure form ($O_2$), or air (a mixture of $O_2$ and $N_2$). The solid polymer electrolytes are typically made from ion exchange resins such as perfluoronated sulfonic acid. The anode/cathode typically comprises finely divided catalytic particles, which are often supported on carbon particles, and mixed with a proton conductive resin. The catalytic particles are typically costly precious metal particles. These membrane electrode assemblies are relatively expensive to manufacture and require certain conditions, including proper water management and humidification, and control of catalyst fouling constituents such as carbon monoxide (CO), for effective operation.

For vehicular applications, it is desirable to use a liquid fuel such as an alcohol (e.g., methanol or ethanol), or hydrocarbons (e.g., gasoline) as the source of hydrogen for the fuel cell. Such liquid fuels for the vehicle are easy to store onboard and there is a nationwide infrastructure for supplying liquid fuels. However, such fuels must be dissociated to release the hydrogen content thereof for fueling the fuel cell. The dissociation reaction is accomplished within a chemical fuel processor or reformer. The fuel processor contains one or more reactors wherein the fuel reacts with steam and sometimes air, to yield a reformate gas comprising primarily hydrogen and carbon dioxide. For example, in the steam methanol reformation process, methanol and water (as steam) are ideally reacted to generate hydrogen and carbon dioxide. In reality, carbon monoxide and water are also produced. In a gasoline reformation process, steam, air and gasoline are reacted in a fuel processor which contains two sections. One is primarily a partial oxidation reactor (POX) and the other is primarily a steam reformer (SR). The fuel processor produces hydrogen, carbon dioxide, carbon monoxide and water. Downstream reactors may include a water/gas shift (WGS) and preferential oxidizer (PROX) reactors. In the PROX, carbon dioxide ($CO_2$) is produced from carbon monoxide (CO) using oxygen from air as an oxidant. Here, control of air feed is important to selectively oxidize CO to $CO_2$. A combustor typically is included in a fuel cell system and is used to heat various parts of the fuel processor, including reactors, as needed.

Fuel cell systems which process a hydrocarbon fuel to produce a hydrogen-rich reformate for consumption by PEM fuel cells are known and are described in U.S. patent application Ser. Nos. 08/975,422, which corresponds to U.S. Pat. No. 6,232,005 issued on May 15, 2001, in U.S. Ser. No. 08/980,087, which corresponds to U.S. Pat. No. 6,077,620 issued on Jun. 20, 2000, and in U.S. Ser. No. 09/187,125, which corresponds to U.S. Pat. No. 6,238,815 issued on May 29, 2001, each of which is assigned to General Motors Corporation, assignee of the present invention; and in International Application Publication Number WO 98/08771, published Mar. 5, 1998. A typical PEM fuel cell and its membrane electrode assembly (MEA) are described in U.S. Pat. Nos. 5,272,017 and 5,316,871, issued respectively Dec. 21, 1993 and May 31, 1994, and assigned to General Motors Corporation.

Efficient operation of a fuel cell system depends on the ability to effectively control operation of major interdependent components or subsystems such as the combustor and fuel processor. The interpendent operation of the combustor and fuel processor render control of each particularly difficult. The combustor heats up the fuel processor to a temperature sufficient for the fuel processor to generate hydrogen-rich feed for the fuel cell. Then, the combustor is at least partially fueled by the hydrogen-rich stream from the fuel processor.

Therefore, it is desirable to provide a method to determine whether a nominal expected relationship exists between certain combustor and fuel processor operating parameters.

SUMMARY OF THE INVENTION

The present invention is directed to the operation of a fuel cell system which comprises a combustor which heats a fuel processor which, in turn, generates a hydrogen-rich feed stream for use in a fuel cell stack. The hydrogen-rich feed stream is consumed in the fuel cell stack whereby electricity is produced. The present invention provides a new method for operating the combustor within the system and, particularly, an improved method for regulating fuel input to the combustor. In one aspect, supplemental, hydrocarbon fuel input to the combustor is regulated based on the temperature of the fuel processor. Preferably, the fuel processor comprises a reactor having a catalytic bed, and the fuel input to the combustor is adjusted based on a change in temperature of such catalytic bed.

In one aspect, the invention provides a method for operating a combustor in response to a monitored of the fuel processor, detecting a relatively low temperature of the fuel processor, adjusting hydrocarbon fuel supply to the combustor, and comparing such adjusted supply (fuel flow) to the combustor to a predetermined fuel flow rate or range of fuel flow rates. In order to further appreciate features of the invention, it is helpful to understand the relationship between the combustor, fuel processor, and fuel cell stack.

The fuel processor generates a hydrogen-rich product (feed stream) from a hydrocarbon. The hydrogen-rich feed stream from the fuel processor is supplied to a fuel cell stack which generates electricity by oxidation of the hydrogen with oxygen. In a preferred start-up mode, a hydrocarbon fuel stream and an air stream are supplied to the combustor. The hydrocarbon fuel and air are reacted or burned in the combustor in order to generate heat to heat the fuel processor. The products of the combustion reaction in the combustor are supplied to the fuel processor.

Preferably, one or more reactors within the fuel processor are heated by indirect heat transfer from the products of combustion. After the products of combustion from the combustor have begun to heat the fuel processor, a hydrocarbon reactant is supplied to the fuel The hydrocarbon reactant is reacted with steam, air, or a combination of both in the fuel processor. The reaction between the hydrocarbon reactant and the steam and/or air produces a hydrogen-rich feed stream which is usable in the fuel cell stack to produce electricity.

In one aspect, after the fuel processor has attained and maintained its desired temperature, it produces the hydrogen-rich stream which is consumed in the fuel cell stack to produce electricity. However, the quantity of hydrogen supplied to the fuel cell stack is greater than that required to produce the increment of power desired from the system, therefore, at least a portion of the hydrogen-rich feed stream is not consumed in the fuel cell stack and is directed to the combustor. This excess portion of the hydrogen-rich feed stream is reacted with the air stream in the combustor for generation of heat to heat the fuel processor.

Therefore, the invention provides a method of operating a combustor to heat a fuel processor in a fuel cell system, in which the fuel processor generates a hydrogen-rich stream, a portion of which is consumed in a fuel cell stack and a portion of which is discharged from the fuel cell stack and supplied to the combustor. Accordingly, first and second streams are supplied to the combustor. The first stream is a hydrocarbon fuel stream and the second stream consists of the hydrogen-rich stream. More particularly, the method comprises the steps of: monitoring the temperature of the fuel processor; regulating the quantity of the first stream to the combustor according to the temperature of the fuel processor; and comparing said quantity of said first stream to a predetermined value or range of predetermined values.

In another aspect, the method of the invention includes generating an output signal when the quantity of the fuel stream supplied to the combustor is different from a predetermined value. Preferably, this comparison occurs after each adjustment in the quantity takes place. Such comparison preferably occurs before and/or after each adjustment. If desired, the quantity of the first stream may be compared to a range of predetermined values and an output signal generated if the value is outside the predetermined range.

A variety of corrective actions are possible once it is determined that the quantity of the first stream is different from a predetermined value or range of predetermined values.

In a preferred aspect, the method further includes increasing the quantity of the first stream to the combustor in response to a decrease in the temperature of the fuel processor.

Another corrective action is terminating operation of the fuel cell stack when the output signal is generated. It is possible to block the output signal for a period of time called a time delay and then terminate operation of the fuel cell stack when the time duration of the signal exceeds a predetermined time period.

In a preferred aspect, the fuel processor comprises a reactor having a catalytic bed and the monitored temperature of the fuel processor is the temperature of such bed. By monitoring the temperature of the catalytic bed in the fuel processor, a determination is made whether to-adjust the supply of the first stream to the combustor in accordance with such monitored temperature.

In summary, in a preferred aspect, the method of the invention determines a relatively low temperature level in the fuel processor, increases the quantity of the first stream supplied to the combustor, and then compares such adjusted quantity to a desired or predetermined value or range of values.

BRIEF DESCRIPTION OF THE DRAWINGS

The various features, advantages and other uses of the present invention will become more apparent by referring to the following description and drawings in which.

DETAILED DESCRIPTION OF THE PREFERRED EMBODIMENTS

In one aspect, the invention provides a method of operating a combustor to heat a fuel processor to a desired temperature in a fuel cell system, wherein the fuel processor generates hydrogen ($H_2$) from a hydrocarbon for reaction within a fuel cell to generate electricity. As part of a system start-up mode, the combustor mode of operation changes from one wherein a hydrocarbon fuel is reacted in the combustor to heat the fuel processor, to a mode where hydrogen-rich feed stream produced by the fuel processor is re-circulated back to the combustor for reaction therein to supply heat to the system. During running mode, the fuel processor generates hydrogen-rich feed for the fuel cell stack in an amount significantly greater than that required for consumption by the stack. Here, a portion of the hydrogen-rich feed stock is recirculated back to the combustor as stated. The invention provides a method and select system design features which cooperate to regulate fuel input to the combustor based on the temperature of the fuel processor.

Figure 1:
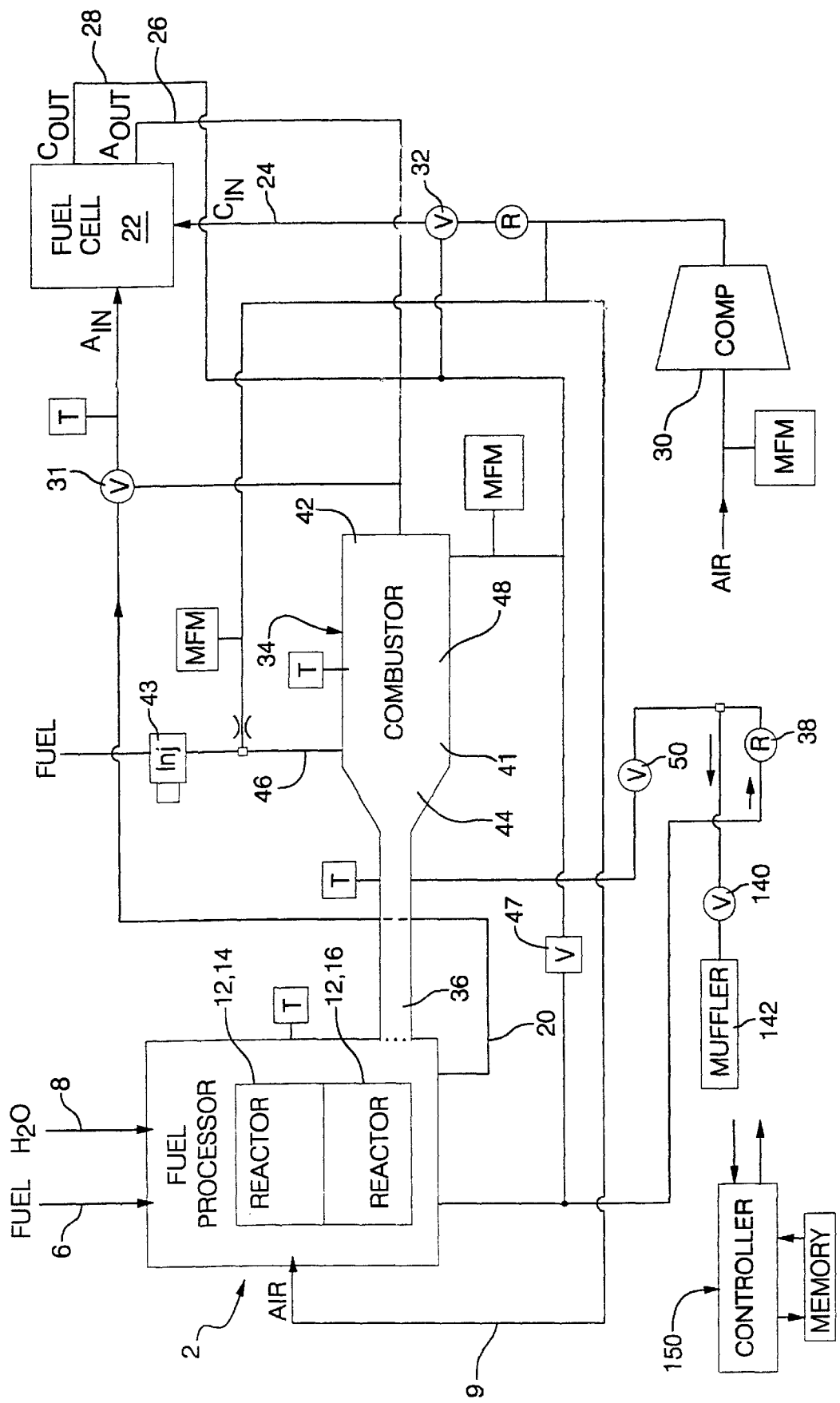
FIG. 1 is a drawing depicting a fuel cell system which comprises a combustor, fuel processor and fuel cell stack, operated according to the present invention.

The various aspects of the invention may be further understood with reference to the exemplary fuel cell system shown in FIG. 1. Therefore, before further describing the invention, it is useful to understand the system within which the preferred method of operation and apparatus features are implemented.

FIG. 1 illustrates an example of a fuel cell system. The system may be used in a vehicle (not shown) as an energy source for vehicle propulsion. In the system, a hydrocarbon is processed in a fuel processor, for example, by reformation and preferential oxidation processes, to produce a reformate gas which has a relatively high hydrogen content on a volume or molar basis. Therefore, reference is made to hydrogen-rich ($H_2$)or relatively high hydrogen content reformate or feed stream.

The invention is hereafter described in the context of a fuel cell fueled by an $H_2$-rich reformate regardless of the method by which such reformate is made. It is to be understood that the principles embodied herein are applicable to fuel cells fueled by $H_2$ obtained from any source, including reformable hydrocarbon and hydrogen-containing fuels such as methanol, ethanol, gasoline, alkene, or other aliphatic or aromatic hydrocarbons in liquid or gaseous forms.

As shown in FIG. 1, a fuel cell apparatus includes a fuel processor 2 for catalytically reacting a reformable hydrocarbon fuel stream 6, and water in the form of steam from a water stream 8. In some fuel processors, air is also used in a combination preferential oxidation/steam reforming reaction. In this case, fuel processor 2 also receives an air stream 9. The fuel processor contains one or more reactors 12 wherein the reformable hydrocarbon fuel in stream 6 undergoes dissociation in the presence of water/steam 8 and sometimes air (in stream 9) to produce the hydrogen-rich reformate. Further, each reactor 12 may comprise one or more reactor beds. Reactor 12 may have one or more sections or beds, and a variety of designs are known and usable. Therefore, the selection and arrangement of reactors 12 may vary; and exemplary fuel reformation reactor(s) 14 and downstream reactor(s) 16 are described immediately below.

By way of example, in an exemplary steam/methanol reformation process, methanol and water (as steam) are ideally reacted in a reactor 14 to generate hydrogen and carbon dioxide as described earlier in the background. In reality, carbon monoxide and water are also produced. By way of further example, in an exemplary gasoline reformation process, steam, air and gasoline are reacted in a fuel processor which comprises a reactor 14 which has two sections. One section of the reactor 14 is primarily a partial oxidation reactor (POX) and the other section of the reactor is primarily a steam reformer (SR). As in the case of methanol reformation, gasoline reformation produces the desired hydrogen but, in addition, produces carbon dioxide, water and carbon monoxide. After each type of reformation, it is desirable to reduce the carbon monoxide content of the product stream.

Accordingly, the fuel processor 2 also typically also includes one or more downstream reactors 16, such as water/gas shift (WGS) and preferential oxidizer (PROX) reactors which are used to produce carbon dioxide from carbon monoxide, as described earlier in the background. Preferably, the initial reformate output gas stream which comprises hydrogen, carbon dioxide, carbon monoxide (CO) and water is further treated in a preferential oxidation (PROX) reactor 16 to reduce the CO-levels therein to acceptable levels, for example, below 20 ppm. Then, during running mode, the $H_2$-rich reformate 20 is fed through valve 31 into the anode chamber of a fuel cell stack 22. At the same time, oxygen (e.g., air) from an oxidant stream 24 is fed into the cathode chamber of the fuel cell stack 22. Air for the oxidant stream 24 is provided by an air supply, preferably compressor 30. The hydrogen from the reformate stream 20 and the oxygen from the oxidant stream 24 react in the fuel cell 22 to produce electricity. Exhaust or effluent 26 from the anode side of the fuel cell 22 contains some unreacted hydrogen. The exhaust or effluent 28 from the cathode side of the fuel cell 22 contains some unreacted oxygen.

In normal running or operational conditions, air from the air supply (compressor 30)is directed to the fuel cell 22 by a valve 32. During start-up, however, the valve 32 is actuated to provide air directly to the input of a combustor 34. The air is used in combustor 34 to react with a fuel, preferably a liquid hydrocarbon, supplied through line 46. The heat of combustion is used to heat various parts of the fuel processor 2.

It should be noted that some of the reactions which occur in fuel processor 2 are endothermic and so require heat; other reactions are exothermic and require removal of heat. Typically, the PROX reactor 16 requires removal of heat. One or more of the reformation reactions in reactor 14 are typically endothermic. This is typically accomplished by preheating reactants fuel 6, steam 8, and air 9 and/or by heating selected reactors.

Figure 3:
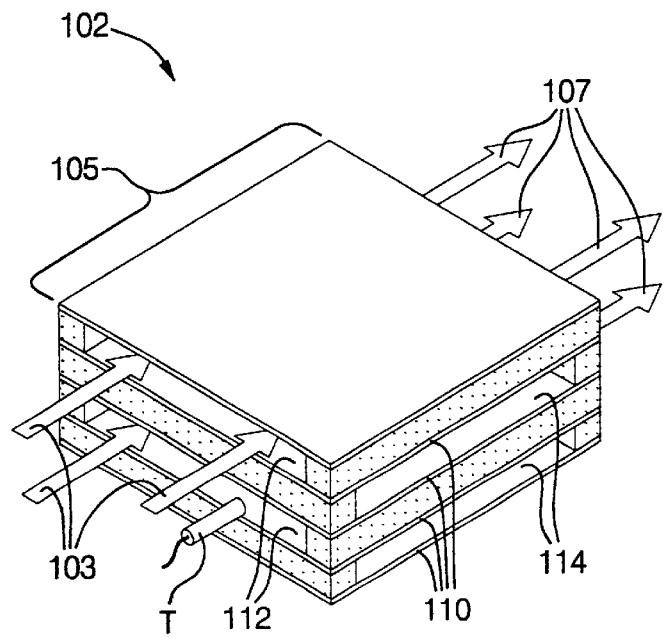
FIG. 3 is a partial perspective view of an interior section of a reactor.

Heat from the combustor 34 is directed through line 36 to heat selected reactant inputs and/or reactors and reactor beds in the fuel processor 2. The combustor 34 achieves heating of the selected components, reactors and beds in the fuel processor 2, as necessary, by indirect heat transfer thereto. Typically, such indirectly heated reactor 102 comprise a reaction chamber 105 with inlet 103 and an outlet 107 (FIG. 3). Within the reaction chamber 105, the beds are in the form of carrier member substrates 110 each having a first surface 112 carrying catalytically active material for accomplishing the desired chemical reactions. A second surface 114 opposite the first surface is for heat transfer from hot gases to the carrier member substrates 110. Desirably, temperature monitor "T" (FIG. 3) is used to monitor the temperature of the catalytic bed 112 and reactant gases 103. Preferably, the temperature monitor is a thermocouple which monitors the temperature of the catalytic bed 112. In addition, the combustor 34 is usable to preheat the fuel 6, water 8 and air 9 being supplied as reactants to the fuel processor 2.

It should be noted that the air 9 supplied to the fuel processor 2 may be used in one or more of the reactors 12. If reactor 14 is a gasoline reformation reactor, then air from line 9 is supplied to reactor 14. The PROX reactor 16 also utilizes air to oxidize CO to $CO_2$ and also receives air from air supply source (compressor 30) via line 9.

The combustor 34 defines a chamber 41 with an inlet end 42, an exhaust end 44 and a catalyst section 48 between the ends. In a start up mode, hydrocarbon fuel 46 is injected into the combustor. The hydrocarbon fuel, if in liquid form, is preferably vaporized either before being injected into the combustor or in a section of the combustor to disperse the fuel for combustion. It is to be understood that although preferably disclosed as a liquid hydrocarbon fuel, the hydrocarbon may take another form such as a gas. Vaporization may be done by an electric heater. Once the system is operating and the combustor has heated up, vaporization may occur by heat exchange using heat from the combustor exhaust to vaporize incoming fuel. Preferably, a fuel metering device or injector 43 is provided to control the rate at which hydrocarbon fuel is provided to the combustor.

The hydrocarbon fuel 46 and the anode effluent 26 are reacted in the catalyst section 48 of the combustor 34, which section is between the inlet and exhaust ends 42 and 44, respectively, of the combustor 34. Oxygen is provided to the combustor 34 either from the air supply (i.e., compressor 30) via valve 32 or from a second air flow stream, such as a cathode effluent stream 28, depending on system operating conditions. A valve 50 permits release of the combustor exhaust 36 to the atmosphere when it is not needed to heat reactors in the fuel processor 2.

As can be seen from FIG. 1 and the above description, the hydrocarbon fuel stream 46 supplements the anode effluent 26 fuel for the combustor 34, as may be needed, to meet the transient and steady state needs of the fuel cell system. In some situations, exhaust gas passes through a regulator 38, a shutoff valve 140 and a muffler 142 before being released to the atmosphere. In FIG. 1, the symbols are as follows: "V" is valve, "MFM" is mass flow meter, "T" is temperature monitor, "R" is regulator, "C" is cathode side of the fuel cell, "A" is anode side of the fuel cell, "INJ" is injector, "COMP" is compressor, and "P" is pressure monitor.

The amount of heat demanded by the selected reactors within the fuel processor 2, which is to be supplied by the combustor 34, is dependent upon the amount of fuel and water input and ultimately the desired reaction temperature in the fuel processor 2. As stated earlier, sometimes air through line 9 is also used in the fuel processor and must also be considered along with the fuel and water input. To supply the heat demand of the fuel processor 2, the combustor 34 utilizes all anode exhaust or effluent 26 and potentially some hydrocarbon fuel 46. Enthalpy equations are used to determine the amount of cathode exhaust air to be supplied to the combustor 34 to meet the desired temperature requirements of the combustor 34 and ultimately to satisfy the fuel processor 2. The oxygen or air provided to the combustor 34 includes one or both of cathode effluent exhaust 28, which is typically a percentage of the total oxygen supplied to the cathode of the fuel cell 22, and an air stream from compressor 30 depending on whether the apparatus is operating in a start-up mode wherein the compressor air stream is exclusively employed, or in a run mode using the cathode effluent 28 and/or compressor air. In the run mode, any total air, oxygen or diluent demand required by the combustor 34, which is not met by the cathode effluent 28, is supplied by the compressor 30 in an amount to satisfy the temperature and heat demanded by the combustor 34 and the fuel processor 2, respectively. The air control is implemented via an air dilution valve 47 which preferably is a stepper motor driven valve having a variable orifice to control the amount of bleed-off of cathode exhaust 28 supplied to the combustor 34.

In this exemplary representation of a fuel cell apparatus, in one aspect of the invention, operation of the combustor and start-up in a fuel cell system is as follows. At the beginning of operations when the fuel cell apparatus is cold and starting up: (1) the compressor 30 is driven by an electric motor energized from an external source (e.g., a battery) to provide the necessary air to the system; (2) air is introduced into the combustor 34 and hydrocarbon fuel 46 (e.g., MeOH or gasoline) is injected into the combustor 34; (3) the air and fuel react in the combustor 34, where substantially complete combustion of the fuel is effected; and (4) the hot exhaust gases exiting the combustor 34 are conveyed through line 36 to the selected components, such as reactant 6, 8 and/or 9 and reactors 12 associated with the fuel processor 2.

Once the reactors 12 in the fuel processor 2 have attained adequate temperature, the reformation process begins and: (1) valve 32 is activated to direct air from compressor 30 to the cathode side of the fuel cell 22; (2) fuel 6 and water 8 and/or air are fed to the fuel processor 2 to commence the reformation reaction; (3) reformate exiting the fuel processor 2 through line 20 is fed to the anode side of the fuel cell 22; (4) anode effluent 26 from the fuel cell 22 is directed into the combustor 34; (5) cathode effluent 28 from the fuel cell 22 is directed into the combustor 34; (6) the fuel 46, air, cathode effluent 28 and anode effluent 26 are burned in the combustor 34. In a preferred sequence, step (2) is implemented first along with the supplying of air directly to the combustor. Then, when the hydrogen-rich stream has adequately low CO level, steps (1) and (3) are implemented, followed by steps (4), (5) and (6).

Under certain conditions, the combustor 34 could operate solely on the anode 26 and cathode 28 effluents, without the need for additional hydrocarbon fuel 46. Under such conditions, fuel injection to the combustor 34 is discontinued. Under other conditions, e.g., increased power demands, fuel 46 is provided to supplement the Aout, 26 to combustor 34. It can be seen that the combustor 34 receives multiple fuels, such as a hydrocarbon fuel 46 as well as anode effluent 26 from the anode of the fuel cell 22. Oxygen depleted exhaust air 28 from the cathode of the fuel cell 22 and air from the compressor 30 are also supplied to the combustor 34.

According to the present fuel cell system example, a controller 150 shown in FIG. 1 controls various aspects of the operation of the system shown in FIG. 1. The controller 150 may comprise any suitable microprocessor, microcontroller, personal computer, etc., which has a central processing unit capable of executing a control program and data stored in a memory. The controller 150 may be a dedicated controller specific to any of the components in FIG. 1, or implemented in software stored in the main vehicle electronic control module. Further, although software based control programs are usable for controlling system components in various modes of operation as described above, it will also be understood that the control can also be implemented in part or whole by dedicated electronic circuitry. The controller 150 controls the injector 43 thereby regulating the rate of hydrocarbon fuel fed to the combustor 34. The controller 150 also monitors various parameters in the system such as pressure and temperature. Preferably, controller 150 regulates the operation of injector 43 to control supply of fuel to the combustor 34.

Figure 2:
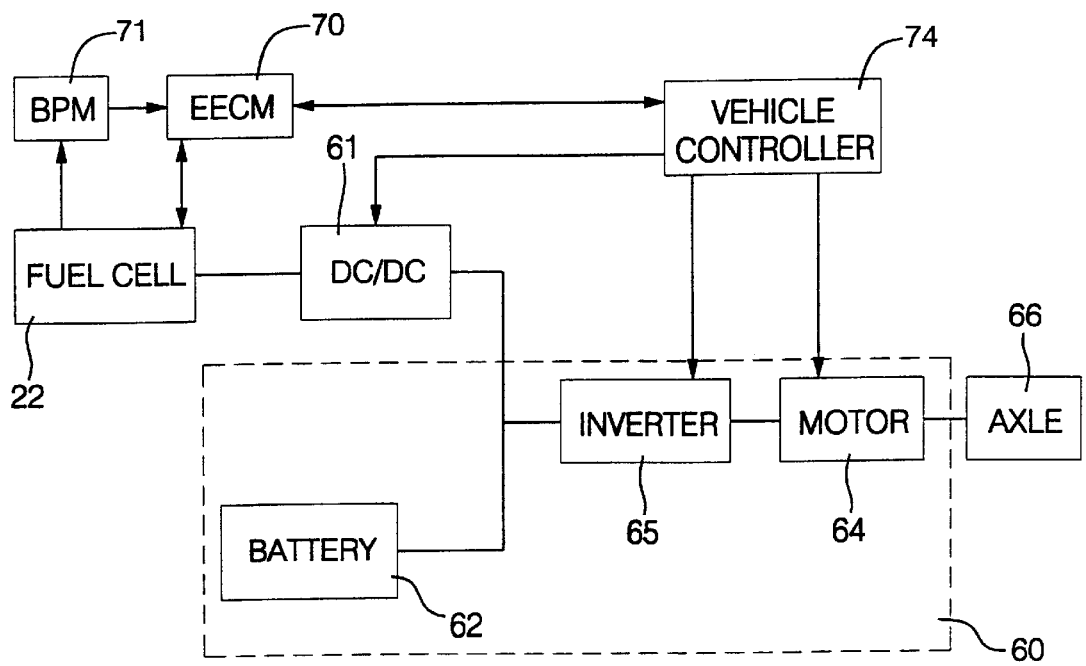
FIG. 2 is a drawing of the fuel cell stack shown in FIG. 1 connected in a pictorial representation of a use application.

In a preferred embodiment, the fuel cell system comprises the fuel cell 22 as part of a vehicle propulsion system 60 (see FIG. 2). Here, a portion of the circuit 60 external to fuel cell system, comprises a battery 62, an electric motor 64, and associated drive electronics including inverter 65 constructed and arranged to accept electric energy from a DC/DC converter 61 associated with the fuel cell system, and particularly fuel cell 22, and to convert it to mechanical energy produced by motor 64. The battery 62 is constructed and arranged to accept and store electrical energy supplied by fuel cell 22 and to accept and store electrical energy supplied by motor 64 during regenerative braking, and to provide electric energy to motor 64. The motor 64 is coupled to driving axle 66 to rotate wheels of a vehicle (not shown). An electrochemical engine control module (EECM) 70 and a battery pack module (BPM) 71 monitor various operating parameters, including, but not limited to, the voltage and current of the stack. For example, this is done by the battery pack module (BPM) 71, or by the BPM 71 and the EECM 70 together, to send an output signal (message) to the vehicle controller 74 based on conditions monitored by the BPM 71. The vehicle controller 74 controls the electric motor 64, the drive electronics including inverter 65, the DC/DC converter 61, and requests a power level from the EECM 70.

In order to start the system, before the fuel processor 2 produces hydrogen, the combustor 34 is first started. The combustor is typically heated by the use of external fuel 46 which is preferably a liquid hydrocarbon fuel. Such hydrocarbon fuel 46 may be the same as or different from the fuel 6 that is used as a reactant in the fuel processor. The delivery of air by compressor 30, and fuel 46 through injector 43, initiates the start-up mode. The compressor 30 provides the air flow and the injector 43 provides the liquid hydrocarbon fuel to the combustor 34 which converts the fuel to heat, and delivers the heat to fuel processor 2 through line 36. In fuel processor 2, the heat is used to preheat input reactants, fuel 6, water 8, and/or air and also to preheat selected reactors 12 as necessary. Such preheat is typically done by indirect heat transfer using appropriate heat exchangers (not shown) within fuel processor 2.

After the fuel processor 2 heats up, preferably hydrocarbon fuel 6 referred to as one of the reactants, is injected into the fuel processor 2. The hydrocarbon reactant 6 is reacted with water 8 (steam), air, or both to convert the hydrocarbon reactant to a hydrogen-rich ($H_2$)stream. The hydrogen-rich feed stream also contains other constituents such as water, carbon monoxide, and carbon dioxide. These gases ultimately flow to the fuel cell stack 22 through line 20 as described earlier.

Even during a running mode, stack 22 does not consume all of the hydrogen feed produced by the fuel processor 2, so some portion of the hydrogen feed passes through the stack 22 and onto the combustor 34. This portion is referred to as effluent. The combustor 34 at this point receives both hydrogen-rich stack effluent and liquid hydrocarbon fuel 46 provided through injector 43. The liquid fuel is regulated according to the temperature of the fuel processor. The amount of liquid fuel 46 injected through injector 43 is adjusted since it is preferred to use the heating value of the hydrogen containing anode effluent 26 first, and the liquid fuel supplements as necessary based on fuel processor temperature.

Several factors affect the relationship between the fuel cell, the fuel processor, and the combustor. The heat generated by the combustor, the heat demanded by the fuel processor, and the consumption of hydrogen-rich feed stream by the fuel processor, are all subject to variations during system operation. More specifically, the production of hydrogen-rich feed stream by the fuel processor 2, and the consumption of such stream by the stack 22, affect the quantity of hydrogen available to the combustor 34, and there are other factors within the system which also affect such quantity of hydrogen available to the combustor 34, such as diversion of the hydrogen flow or degradation of the catalytic bed 112 within the fuel processor 2.

From the above description, it can be seen that since the liquid fuel injected into the combustor supplements the hydrogen ($H_2$) as necessary, the quantity of such injected fuel required at various points in time must be determined. Such quantity will, in turn, depend on the amount of hydrogen being provided to the combustor. The amount of hydrogen being provided to the combustor is based on an estimate. In other words, as the fuel processor makes hydrogen, the quantity of hydrogen being made by the fuel processor is typically not measured but rather is estimated. Therefore, the quantity of hydrogen being sent from the fuel processor to the stack is usually an estimated quantity. Further, the amount of hydrogen consumed by the stack to produce power is typically not measured, but rather is estimated. Therefore, the amount of hydrogen ultimately received by the combustor is typically based on two estimates. There is a predicted flow rate of hydrogen produced by the fuel processor, a predicted consumption of the hydrogen by the stack, and by difference a predicted amount of hydrogen fuel being sent to the combustor. Such method for predicting the amount of hydrogen provided to the combustor, and by difference the amount of supplemental hydrocarbon fuel required by the combustor, works well so long as the system is functioning in a nominal mode. Here, nominally, the relationship between hydrogen production by the fuel processor, consumption by the stack, and quantity supplied to the combustor, are all within an established and/or predictable range or relationship.

A difficulty arises, however, if there is a variance within the system such as a diversion of hydrogen, fouling of a fuel processor catalyst bed, or other occurrence. In this situation, the quantity of hydrogen received by the combustor may become lower than expected. Although it is possible to envision scenarios where the hydrogen production is higher than expected, the present invention is primarily directed to the situation where the quantity of hydrogen received by the combustor is lower than an expected amount. If such occurs, it will generally be manifest at an early stage in the temperature of a fuel processor catalytic bed being at a relatively low temperature. The sequence of the events is typically as follows. The combustor starts receiving less fuel, that is, the amount of hydrogen received by the combustor decreases for some reason. The control of air flow to the combustor is adjusted in accordance with the new level of fuel flow to the combustor, so that the combustor temperature does not drop. However, the total quantity of energy input in the form of fuel being supplied to the combustor is relatively low. Therefore, although the combustor continues to maintain its internal temperature, the heat output of the combustor is reduced. Consequently, the amount of heat available for extraction by indirect heat transfer of certain parts of the fuel processor becomes less.

By specific analysis of the mode of operation of the combustor and the fuel processor, it has been determined that if hydrogen delivery to the combustor is less than expected, the combustor temperature does not necessarily drop, however, the quantity of heat energy supplied by the combustor to the fuel processor is lessened and a low temperature condition in a catalytic bed of the fuel processor signifies an operating condition different than that nominally expected. The response to such reduction in catalytic bed temperature is the generation of an output signal that indicates that the fuel processor has started to cool off. A response to this situation is the increasing of the amount of hydrocarbon liquid fuel (supplemental fuel) to the combustor. This enables the combustor to supply an increased amount of heat energy to the fuel processor. However, if the system is permitted to increase the amount of supplemental fuel flow based on a reduction in the catalytic bed temperature, the system has been permitted to respond to a problem without having a specific diagnosis made. For example, such a closed loop correction would increase combustor supplemental fuel flow to compensate for a drop in the fuel processor temperature but, as can be appreciated, the injection of supplemental fuel may continue to occur with ever increasing amounts being injected. Therefore, it is necessary to compare the amount of supplemental fuel injected in the combustor 34 to a predetermined value or range of predetermined values. Therefore, by the method of the invention, it is possible to flag the existence of a low temperature in a component of a fuel processor, preferably a catalytic bed 112, and provide a signal. It is also possible to both flag the existence of a low temperature problem and also inject supplemental fuel within certain limits and then provide a signal in the event that such adjustment falls outside a predetermined range. Therefore, the method of the invention provides the flexibility to signal the existence of a low temperature problem in the fuel processor 2, and also to respond to such low temperature condition by initiating or increasing supplemental fuel injected by injector 43 to adjust the temperature and then provide a signal if the amount of supplemental fuel exceeds an expected value or predetermined values. In short, the invention provides the ability to signal the occurrence of a temperature drop or relatively low temperature condition, take corrective action, and then determine if the corrective action is appropriate.

By way of example, such corrective action sequence is as follows. Assume that the supplemental fuel injection rate is set at 2 gms/sec at injector 43. The fuel injected is methanol or gasoline. The controller senses that the temperature in the catalytic bed 112 of the fuel processor 2 has declined, on the order of 5° C., as compared to an expected nominal operating temperature. As a result, a signal is sent. Thereafter, corrective action is taken. For example, an injection rate of 7 gms/sec may be implemented. The controller then determines whether the new injection rate of 7 gms/sec is acceptable based on a predetermined mode of operation of the system. If the injection rate of 7 gms/sec is within an acceptable predetermined range or falls below a maximum predetermined value, then the correction is maintained. If, however, the injection rate of 7 gms/sec falls outside the range or above a predetermined value, then other corrective action may be necessary such as to decrease the load on the system or shut down the system. It is evident that a series of corrective adjustments can be made in the fuel injection rate at injector 43 before it is determined that the increased level of injection falls outside a predetermined range or is above the predetermined value.

In summary, there has been disclosed unique method and apparatus for monitoring the temperature of a fuel processor 2 in a fuel cell system and controlling the quantity of supplemental fuel supplied to the combustor 34 in accordance with the monitored temperature of the fuel processor 2. The monitoring and control method and apparatus of the invention is particularly useful for determining a low temperature condition in the fuel processor and signaling such low temperature condition, and further providing corrective action in response to such low temperature condition by initiating or by increasing the amount of supplemental fuel injected into the combustor. Although the invention finds its particular usefulness as adapted to the determining of a low temperature condition and the initiating or increasing of fuel injection, it will be evident to those skilled in the art that similar adjustment is within the scope of the invention when a relatively high temperature condition is observed and decrease or termination of supplemental fuel is appropriate. In any event, in the broadest aspect, the invention provides the ability to monitor the temperature condition within the fuel processor 2 and regulate the quantity of the supplemental fuel to the combustor 34 according to the temperature of the fuel processor. Thereafter, the invention provides the ability to compare the quantity of the supplemental fuel to a predetermined value or range of predetermined values.

While this invention has been described in terms of certain embodiments thereof, it is not intended that it be limited to the above description, but rather only to the extent set forth in the following claims.

The embodiments of the invention in which an exclusive property or privilege is claimed are defined in the following claims.

What is claimed is:

1. A method of operating a combustor to heat a fuel processor in a fuel cell system, in which the fuel processor includes a reactor which generates a hydrogen containing stream, a first portion of which is consumed in a fuel cell stack and a second portion of which is discharged from the fuel call stack and supplied to the combustor, and wherein first and second streams are supplied to the combustor, the first stream being a hydrocarbon fuel stream and the second stream consisting of said second portion of said hydrogen containing stream, the method comprising the steps of:

monitoring a temperature of the reactor in the fuel processor with a controller;

determining a quantity of the first stream in said controller according to said reactor temperature;

regulating said quantity of the first stream to the combustor via said controller; and comparing said quantity of the first stream with a predetermined value or range of predetermined values.

2. The method of claim 1 which further includes increasing the quantity of said first stream to the combustor in response to a decrease in the temperature of the fuel processor.

3. The method of claim 1 and further including generating an output signal when said quantity is different from said predetermined value or range of predetermined values.

4. The method of claim 1 and further including generating an output signal when said quantity is greater than said predetermined value.

5. The method of claim 1 and further including generating an output signal when said quantity is a value outside the range of said predetermined values.

6. The method of claim 1 wherein the first stream is supplied to the combustor before the second stream is supplied to the combustor and wherein the supply of said first stream is decreased in response to an increase in the temperature of the fuel processor.

7. The method of claim 1 wherein said fuel processor comprises a reactor having a catalytic bed and wherein said monitored temperature is the temperature of said bed.

8. A method of operating a combustor to heat a fuel processor in a fuel cell system, in which the fuel processor generates a hydrogen containing stream a portion of which is consumed in a fuel cell stack and a portion of which is discharged from the fuel cell stack and supplied to the combustor, and wherein first and second streams are supplied to the combustor, the first stream being a hydrocarbon fuel stream and the second stream consisting of said hydrogen containing stream, the method comprising the steps of:

monitoring the temperature of the fuel processor;

regulating the quantity of the first stream to the combustor according to the temperature of the fuel processor;

comparing said quantity of said first stream to a predetermined value or range of predetermined values;

generating an output signal when said quantity is different from said predetermined value or range of predetermined values; and terminating operation of said fuel cell stack when said output signal is generated.

9. A method of operating a combustor to heat a fuel processor in a fuel cell system, in which the fuel processor generates a hydrogen containing stream a portion of which is consumed in a fuel cell stack and a portion of which is discharged from the fuel cell stack and supplied to the combustor, and wherein first and second streams are supplied to the combustor, the first stream being a hydrocarbon fuel stream and the second stream consisting of said hydrogen containing stream, the method comprising the steps of:

monitoring the temperature of the fuel processor;

regulating the quantity of the first stream to the combustor according to the temperature of the fuel processor;

comparing said quantity of said first stream to a predetermined value or range of predetermined values;

generating an output signal when said quantity is different from said predetermined value or range of predetermined values;

terminating operation of said fuel cell stack when said output signal is generated; and blocking said signal for a period of time and terminating operation of said fuel cell stack when the time duration of said signal exceeds said time period.

* * * * *